United States Patent [19]
Burack et al.

[11] Patent Number: 5,394,504
[45] Date of Patent: Feb. 28, 1995

[54] OPTICAL FIBER ENCAPSULATION TECHNIQUES

[75] Inventors: John J. Burack, Toms River, N.J.; William R. Holland, Ambler, Pa.; Frederick Simchock, Trenton, N.J.

[73] Assignee: AT&T Corp., Murray Hill, N.J.

[21] Appl. No.: 201,966

[22] Filed: Feb. 24, 1994

[51] Int. Cl.6 .................... G02B 6/44; B29C 65/18
[52] U.S. Cl. .................... 385/139; 156/176; 156/297; 156/309.6; 156/312; 385/80; 385/114
[58] Field of Search ............ 156/51, 52, 56, 176–179, 156/297–302, 309.6, 311, 312; 385/31, 76, 77, 78, 80, 95–99, 114, 115, 123, 128, 129, 147, 139

[56] References Cited

U.S. PATENT DOCUMENTS

| | | | |
|---|---|---|---|
| 3,271,214 | 9/1966 | Tabor | 156/52 |
| 3,666,587 | 5/1972 | Nagao | 156/199 |
| 3,871,935 | 3/1975 | Gloge et al. | 385/97 X |
| 4,138,193 | 2/1979 | Olszewski et al. | 385/114 |
| 4,541,882 | 9/1985 | Lassen | 156/150 |
| 4,715,700 | 12/1987 | Daniel | 385/31 |
| 5,204,925 | 4/1993 | Bonanni et al. | 385/89 |
| 5,259,051 | 11/1993 | Burack et al. | 385/76 |
| 5,292,390 | 3/1994 | Burack et al. | 156/176 |

OTHER PUBLICATIONS

"Electro-Optical Board Technology Base on Discrete Wiring," by W. Delbare et al., presented at 1991 International Electronics Packaging Conference, Sep. 17, 1991, pp. 604–618.

Primary Examiner—John D. Lee
Attorney, Agent, or Firm—Roderick B. Anderson

[57] ABSTRACT

Optical fibers are encapsulated, first by bonding them to a first surface (18) of a flat member (17) having first and second opposite major surfaces. The flat member and a sheet of thermoplastic (13) are placed in an air-tight chamber (10) such that a first major surface of the sheet faces the first major surface (18) of the flat member (17). Next, the air pressure on the second major surface of the flat member is made to be significantly lower than the air pressure on the second surface of the thermoplastic sheet (13), thereby to cause the sheet to press against the flat member. The thermoplastic sheet is heated sufficiently during this process to cause it to adhere to the first surface (18) of the flat member, thereby to encapsulate the optical fibers.

17 Claims, 2 Drawing Sheets

OPTICAL FIBER ENCAPSULATION TECHNIQUES

TECHNICAL FIELD

This invention relates to optical fiber interconnections and, more particularly, to techniques for encapsulating optical fibers that have been bonded to one surface of a member such as an optical backplane.

BACKGROUND OF THE INVENTION

The patent of Burack et at., U.S. Pat. No. 5,259,051, granted Nov. 2, 1993, hereby incorporated by reference herein, describes a method for making optical backplanes by using a robotic routing machine to apply optical fibers to a fiat surface of a flexible plastic substrate. The fibers are bonded to the substrate by a pressure-sensitive adhesive, and after routing they are covered by a plastic sheet that encapsulates them to protect them, to give structural mechanical stability, and to keep the optical fibers in place during the handling of the optical backplane. The component optical fibers are typically used as large-capacity transmission lines between printed wiring boards or between optical circuits.

The copending application of Burack et al., Ser. No. 07/1954,720, filed Sep. 30, 1992, describes the difficulty of applying the plastic sheet to the optical fibers in a manner that gives the attributes of a good encapsulation but without damaging the fibers. A two step process is described for applying heat and pressure with platen press apparatus. While we have found that this method of encapsulating the fibers gives greatly improved results, we have found that too often fibers are nevertheless damaged; in an effort to avoid all damage, the stability and dependability of the encapsulation is sometimes compromised. These problems occur particularly when an extremely dense array of optical fibers including many crossovers is included on the surface of the flexible plastic substrate. Accordingly, it would be deskable to provide an encapsulation method that firmly encases optical fibers, including optical fiber crossovers, without damaging or weakening any of the fibers.

SUMMARY OF THE INVENTION

In one embodiment, optical fibers are encapsulated, first by bonding them to a first surface of a flat member having first and second opposite major surfaces. The flat member and a sheet of plastic are placed in an airtight chamber such that a first major surface of the sheet faces the first major surface of the member. Next, the air pressure on the second major surface of the flat member is made to be significantly lower than the air pressure on the second surface of the plastic sheet, thereby to cause the sheet to press against the flat member. The plastic sheet is heated sufficiently during this process to cause it to adhere to the first surface of the flat member, thereby to encapsulate the optical fibers.

Using air pressure to press the plastic sheet against the optical fibers has been found to be a superior method for applying the pressure needed for a sturdy bond, while distributing applied forces to avoid a concentration of forces on such protrusions as a crossover of optical fibers. It also avoids the need for precisely planar parallel platens for distributing forces evenly. These and other objects, features and advantages of the invention will be better understood from a consideration of the following detailed description taken in conjunction with the accompanying drawing.

DETAILED DESCRIPTION

Figure 1:
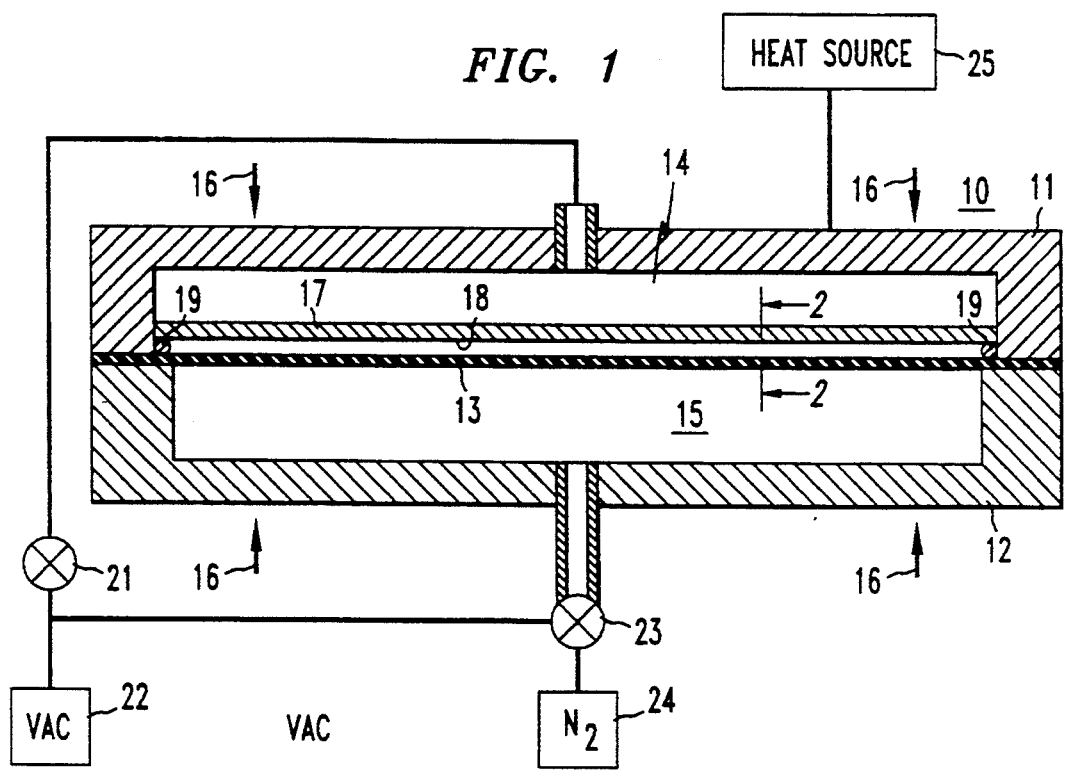
FIG. 1 is a sectional view of an air-tight chamber used for encapsulating optical fibers.

The drawings are schematic, with in some cases dimensions purposely distorted to aid in clarity of exposition. Referring now to FIG. 1, there is shown a substantially air-tight chamber 10 which is used for encapsulating optical fibers in accordance with one embodiment of the invention. The air-tight chamber 10 is defined by two enclosure members 11 and 12 which are clamped to opposite sides of a thermoplastic sheet 13. The clamping of the two enclosure members is schematically represented by arrows 16 which represents pressure applied, for example, by a press, or by a clamping member or members, to the enclosure members 11 and 12. The thermoplastic sheet 13 is of a material that is substantially impermeable to air such as polyurethane; it extends around the entire periphery of air-tight chamber 10 and effectively constitutes an air-tight gasket between enclosure members 11 and 12. The thermoplastic sheet 13 thus effectively divides the air-tight chamber 10 into an upper chamber portion 14 and a lower chamber portion 15 which are mutually substantially hermetically sealed.

The upper chamber portion 14 includes a flat member 17 having a first surface 18 to which optical fibers (not shown) have been bonded. The purpose of the apparatus of FIG. 1 is to encapsulate the optical fibers by bonding the sheet 13 to the first surface 18 of the flat member 17, which contains the fibers. Flat member 17 is separated from sheet 13 by spacers 19. The upper chamber portion 14 is connected via a valve 21 to vacuum apparatus 22. Lower chamber portion 15 is connected via a valve 23 to either the vacuum apparatus 22 or to a source of gas 24 such as nitrogen gas. The entire chamber 10 is capable of being heated by a heat source schematically shown at 25.

Figure 2:
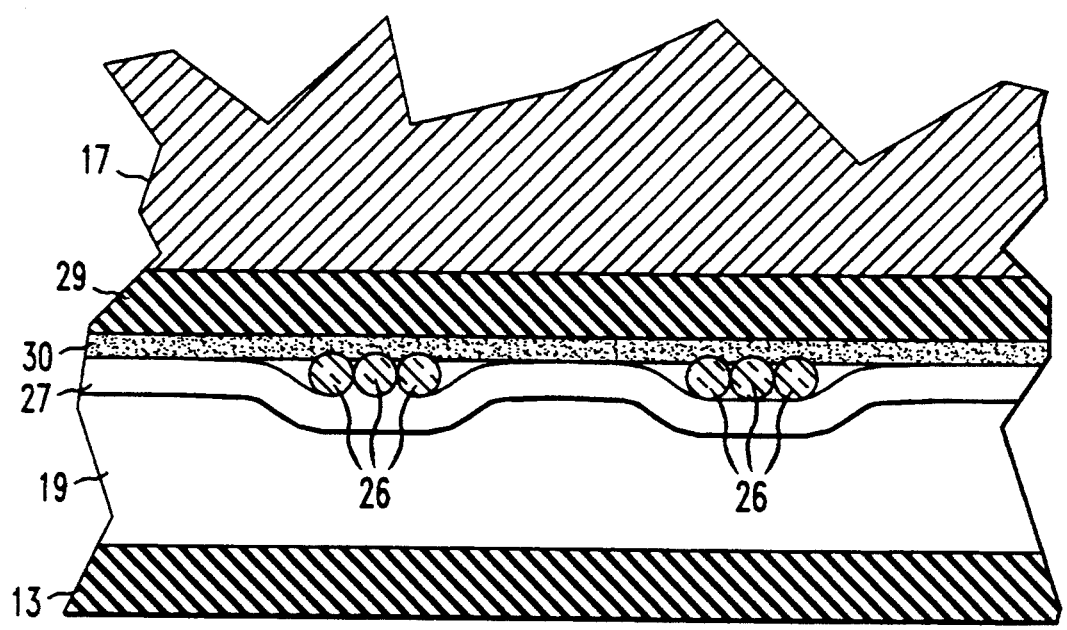
FIG. 2 is a schematic sectional view taken along lines 2—2 of FIG. 1.

The apparatus of FIG. 1 is designed to encapsulate optical fibers that have been routed onto a surface of a sheet of flexible plastic. Referring to FIG. 2, optical fibers 26 and 27 are illustratively bonded to a flexible plastic substrate 29 by pressure-sensitive adhesive 30 by the technique described in detail in the Burack et al. patent. The fibers 26 may be grouped in groups of three, as shown, for reasons given in the Burack et at. patent, and there may be a plurality of crossovers in which optical fibers such as fiber 27 overlap .optical fibers 26. The flexible plastic substrate 29 is bonded by a temporary adhesive tape, Flexmark (TM) DFM 700 Clear V-302 ULP, available from the Flexcon Company, Spencer, Mass., U.S.A., to the flat rigid member 17, which may be a flat sheet of aluminum, for example.

Figure 3:
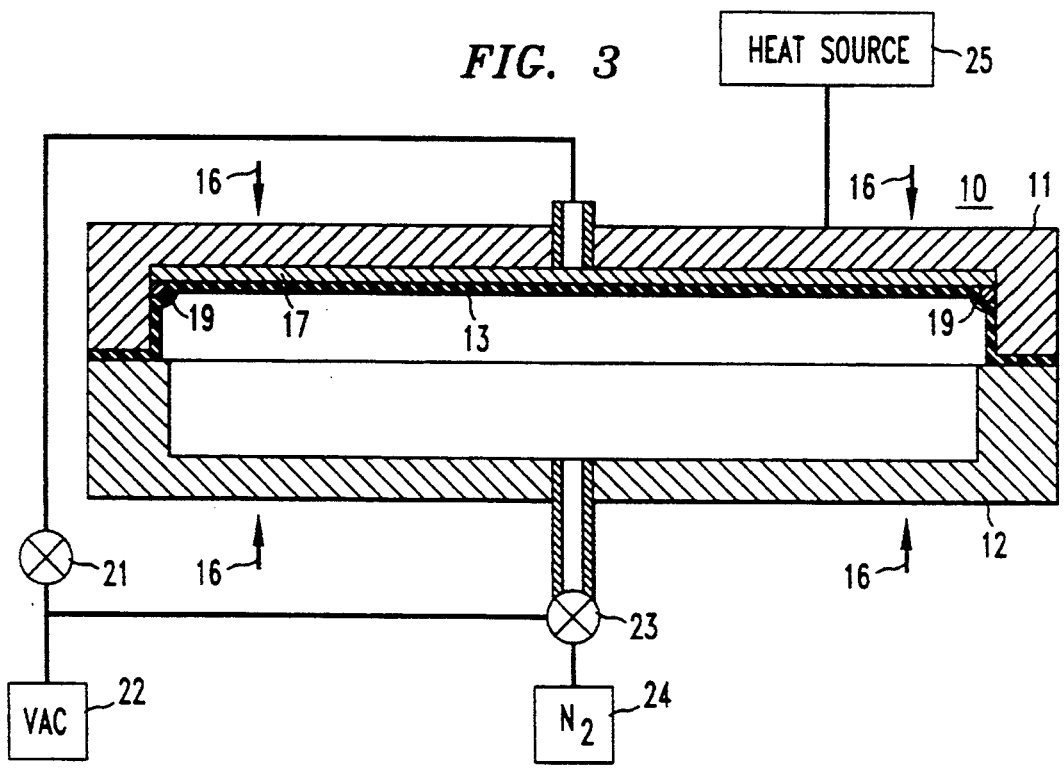
FIG. 3 is a sectional view of the chamber of FIG. 1 at a subsequent stage of the process.

In operation, both valves 21 and 23 of FIG. 1 are first connected to vacuum apparatus 22 to provide a partial vacuum in both the upper chamber portion 14 and the lower chamber portion 15. The purpose of this operation is to draw out the gas between sheet 13 and flat member 17. Next, the heat is applied and valve 21 is connected to vacuum apparatus 22, while valve 23 is connected to air source 24. This produces a much lower gas pressure in upper chamber portion 14 than in lower chamber portion 15. As a consequence, the flat member 17, spacers 19 and the thermoplastic sheet 13 are drawn up vertically as shown in FIG. 3 to bear against the enclosure member 11. The upward air pressure exerted on sheet 13 extends evenly along its entire area. The heat supplied by source 25 is sufficient to cause a partial flowing of the thermoplastic sheet 13. The heat and pressure together cause the sheet 13 to adhere to the flat member 17, thereby to encapsulate the optical fibers bonded to the surface of flat member 17. Thereafter, the bonded structure is removed from chamber 10, and the plastic substrate 29 of FIG. 2 is peeled away from rigid member 17. The composite structure including plastic substrate 29, optical fibers 26 and bonded thermoplastic sheet 13 then constitutes, for example, an optical backplane.

The applied air pressure differential is typically fifteen to forty pounds per square inch, and the heat is applied to a temperature of one hundred to one hundred forty degrees Celsius. The advantage of applying pressure as shown is that the pressure is inherently equally distributed, rather than concentrated at protrusions such as crossovers. As a consequence, for a given yield, higher temperatures and pressures can normally be used in the apparatus of FIG. 3 than could be used if the pressure were applied mechanically. Thus, for a given yield, the encapsulation produced with the invention provides better encasement and structural support for the optical fibers.

Figure 4:
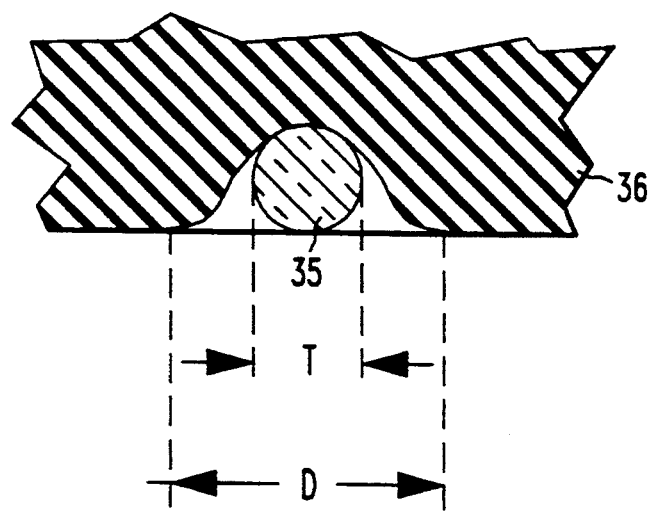
FIG. 4 is a schematic sectional view of a thermoplastic encapsulant overlying an optical fiber.

The benefit of using the higher pressure can be seen by a visual inspection of the encapsulated optical fibers which shows a snug fit of the thermoplastic around each group of three fibers. Using a similar pressure to get a similar snug fit with a platen press results in a greater number of failures than with the invention. Referring to FIG. 4, an optical fiber 35 having a thickness t of ten mils (0.25 millimeters) is encapsulated by a thermoplastic sheet 36. With the invention, thirty pounds per square inch of pressure was applied at one hundred degrees Celsius for one minute, which yielded a distance d between the contact points of the thermoplastic 36 to the substrate of twenty-six mils (0.65 millimeters). With the platen press, a similar yield required an applied pressure of eighteen pounds per square inch at one hundred degrees Celsius for twenty seconds, and five pounds per square inch for four minutes, as described in the Burack et at. application. This yielded a distance d of between fifty-three and fifty-nine mils (1.32–1.47 millimeters), which indicated an undesirable, looser fit.

Polyurethane has been used as an encapsulant because, in addition to being thermoplastic and providing good protection for the optical fibers, it is effective for hermetically sealing the upper chamber portion 14 from the lower chamber portion 15 and for providing an air-tight seal for the enclosure members 11 and 12. It is also sufficiently elastic to stretch without breaking, as shown in FIG. 3. It is nevertheless believed that other methods could be used for providing the air pressure differential needed to press a plastic sheet against the optical fibers to be encapsulated, and other materials could be used as the encapsulant. The apparatus we have described has been used for making optical backplanes in which optical fibers are bonded to a flexible plastic substrate 29 as shown in FIG. 2. Clearly, the invention could also be used to encapsulate fibers mounted directly on a rigid substrate, and such mounting could be done by methods other than those described in the aforementioned Burack et al. patent. Various other embodiments and modifications may be made by those skilled in the art without departing from the spirit and scope of the invention.

I claim:

1. A method for encapsulating optical fibers comprising the steps of:
   bonding optical fiber to a first surface of a flat member having first and second opposite major surfaces;
   placing the flat member in a substantially air-tight chamber;
   locating a sheet of plastic material in the air-tight chamber such that it is adjacent the first surface of the flat member, the sheet having first and second major surfaces, the first major surface of the sheet facing the first major surface of the flat member;
   making the air pressure on the second major surface of the flat member to be significantly lower than the air pressure on the second surface of the sheet, thereby to cause the sheet to press against the flat member;
   and heating the plastic sheet sufficiently to cause it to adhere to the first surface of the flat member, thereby to encapsulate said optical fibers.

2. The method of claim 1 wherein:
   the sheet of plastic material is substantially impermeable to gas and extends across the air-tight chamber to divide the chamber into first and second chamber portions, the first chamber portion containing the flat member;
   and the making step comprises the step of applying a significantly lower air pressure to the first chamber portion than to the second chamber portion.

3. The method of claim 2 wherein:
   the first chamber portion is partly defined by a first enclosure portion;
   the second chamber portion is partly defined by a second enclosure portion;
   and the first and second enclosure portions are clamped on opposite sides of the sheet of plastic material.

4. The method of claim 3 wherein:
   the optical fiber comprises optical fiber portions which cross over other optical fiber portions.

5. The method of claim 4 wherein:
   the first and second enclosure portions abut on opposite sides of the plastic sheet along an entire periphery of the substantially air-tight chamber;
   and the plastic sheet constitutes a gasket for preventing air from entering the air-tight chamber at the juncture of the first and second enclosure portions.

6. The method of claim 5 wherein:
   the first chamber portion is connected to vacuum apparatus for making a partial vacuum in the first chamber portion;
   and the second chamber portion is connected to a source of gas for maintaining a predetermined relatively high air pressure in the second chamber portion.

7. The method of claim 6 wherein:
   before the making step, both the first and second chamber portions are connected to vacuum apparatus to form a partial vacuum in the first and second chamber portions, and the plastic sheet is separated from the flat member by a spacer member;

during the making step, the partial vacuum is applied to the first chamber portion to cause the second surface of the flat member to bear against the first enclosure portion;

and the plastic sheet is made of thermoplastic material and is sufficiently elastic to bear against both the spacer member and the first surface of the flat member.

8. The method of claim 1 wherein:

the flat member comprises an inflexible portion which defines its second surface and a plastic portion upon which the optical fibers are mounted;

and after adherence of the plastic sheet to the first surface, the plastic portion is removed from the inflexible portion, whereby the optical fibers are encapsulated by the plastic sheet and the plastic portion.

9. A method for encapsulating optical fibers comprising the steps of: bonding optical fiber to a flat surface of a substrate member; pressing a thermoplastic sheet against the flat surface of the substrate member to which the fiber is bonded while applying sufficient heat to the thermoplastic sheet to soften it and cause it to adhere to the flat surface and the fiber; characterized by:

using the thermoplastic sheet to define first and second chambers that are mutually substantially hermetically sealed;

the substrate member being located in the first chamber;

and the pressure is applied to the thermoplastic sheet by producing a significantly lower air pressure in the first chamber than in the second chamber.

10. The method of claim 9 wherein:

certain optical fiber portions bonded to said substrate member cross over other optical fiber portions bonded to such substrate member.

11. The method of claim 10 wherein:

the substrate member comprises an inflexible portion and a flexible plastic portion upon which the optical fibers are mounted.

12. The method of claim 11 wherein:

prior to providing the air pressure differential in the first and second chambers, a partial vacuum is formed in both the first and second chambers to evacuate air between the thermoplastic sheet and the flat surface of the substrate member.

13. The method of claim 12 wherein:

the first chamber is defined by a first enclosure member having a closed peripheral portion that bears against one side of the thermoplastic sheet;

and the second chamber is defined by a second enclosure member having a closed peripheral portion that bears on the side of the thermoplastic sheet opposite the first enclosure member.

14. The method of claim 13 further comprising the step of:

applying opposing forces to the first and second enclosure members the forces being substantially normal to the major surfaces of the thermoplastic sheet.

15. The method of claim 13 wherein:

during the step in which the partial vacuum is applied to both the first and second chambers, the flat substrate member is separated from the thermoplastic sheet by a spacer member;

and wherein the producing of the lower air pressure results in a movement of the substrate member and the spacer member such that the substrate member bears against the first enclosure member, and the thermoplastic sheet is sufficiently elastic to bear against both the spacer member and the flat surface of the substrate member.

16. A method for encapsulating optical fibers comprising the steps of:

routing optical fiber on a first surface of a flat plastic substrate by pressing the fiber against pressure-sensitive adhesive on a first surface of the plastic substrate;

adhering the plastic substrate to a first surface of a flat rigid substrate member;

forming first and second chamber portions by locating first and second enclosure members on opposite sides of a thermoplastic sheet, .the first enclosure member having a first opening and the second enclosure member having a second opening;

locating the rigid Substrate member in the first enclosure member such that the optical fiber faces the thermoplastic sheet but is spaced apart from the thermoplastic sheet;

pressing together the first and second enclosure members with sufficient force that they form air-tight seals with the thermoplastic sheet;

heating the optical fiber and the thermoplastic sheet;

applying a partial vacuum to the first opening, thereby to cause the thermoplastic sheet to be pressed against the optical fiber due to differential air pressure;

said heat and differential air pressure being sufficient to cause bonding of the thermoplastic sheet to the plastic substrate and the optical fiber.

17. The method of claim 16 wherein:

prior to applying the partial vacuum to the first opening, a partial vacuum is applied to both the first and second openings to evacuate air from the space between the plastic substrate and the thermoplastic sheet.

* * * * *